US009838438B2

(12) United States Patent
Jeoung (10) Patent No.: US 9,838,438 B2
(45) Date of Patent: Dec. 5, 2017

(54) COMMUNICATION SYSTEM USING HETEROGENEOUS NETWORKS

(71) Applicant: Openvacs Co., Ltd., Seoul (KR)

(72) Inventor: Young Min Jeoung, Gimpo-si (KR)

(73) Assignee: OPENVACS CO., LTD. (KR)

( * ) Notice: Subject to any disclaimer, the term of this patent is extended or adjusted under 35 U.S.C. 154(b) by 176 days.

(21) Appl. No.: 14/765,914

(22) PCT Filed: Feb. 5, 2014

(86) PCT No.: PCT/KR2014/000960
§ 371 (c)(1),
(2) Date: Aug. 5, 2015

(87) PCT Pub. No.: WO2014/123342
PCT Pub. Date: Aug. 14, 2014

(65) Prior Publication Data
US 2015/0373059 A1 Dec. 24, 2015

(30) Foreign Application Priority Data
Feb. 7, 2013 (KR) .......... 10-2013-0013715
Jul. 23, 2013 (KR) .......... 10-2013-0086766

(51) Int. Cl.
*H04L 29/06* (2006.01)
*H04M 7/00* (2006.01)
*H04W 88/16* (2009.01)

(52) U.S. Cl.
CPC ...... *H04L 65/1059* (2013.01); *H04L 65/1069* (2013.01); *H04M 7/006* (2013.01); *H04W 88/16* (2013.01)

(58) Field of Classification Search
CPC ............. H04L 65/1069; H04L 65/1066; H04L 63/0876; H04L 65/10; H04L 65/1059
(Continued)

(56) References Cited

U.S. PATENT DOCUMENTS 6,529,500 B1 * 3/2003 Pandharipande ....... H04L 12/58
370/352
6,757,367 B1 * 6/2004 Nicol ..................... H04B 3/23
379/100.01
(Continued)

FOREIGN PATENT DOCUMENTS

JP 2000-115372 A 4/2000
JP 2001-024820 A 1/2001
(Continued)

OTHER PUBLICATIONS

International Search Report; dated Mar. 31, 2014 for PCT Application No. PCT/KR2014/000960.
(Continued)

*Primary Examiner* — Edan Orgad
*Assistant Examiner* — Emmanuel Maglo
(74) *Attorney, Agent, or Firm* — Mendelsohn Dunleavy, P.C.

(57) ABSTRACT

Disclosed is a communication system and, more particularly, a communication system using heterogeneous networks to support voice calls by combining private mobile networks, Mobile Network Operators (MNOs), and Public Switched Telephone Networks (PSTNs) even when an application for voice talk has not been installed on the mobile terminal.

11 Claims, 6 Drawing Sheets

(58) Field of Classification Search
USPC .................................. 370/259; 709/226, 227
See application file for complete search history.

(56) References Cited

U.S. PATENT DOCUMENTS

| | | | | |
|---|---|---|---|---|
| 7,299,257 | B2* | 11/2007 | Boyer | G06Q 10/107 709/204 |
| 7,302,053 | B2 | 11/2007 | Chang et al. | |
| 8,340,667 | B2* | 12/2012 | Pan | H04W 4/00 370/328 |
| 8,908,678 | B1* | 12/2014 | McGonigal | H04W 28/0268 370/352 |
| 9,049,042 | B2* | 6/2015 | Tagg | H04L 12/2856 |
| 2002/0048351 | A1* | 4/2002 | Donovan | H04L 12/66 379/88.17 |
| 2002/0114282 | A1* | 8/2002 | MeLampy | H04L 29/06027 370/238 |
| 2003/0039242 | A1* | 2/2003 | Moore, Jr. | H04M 1/2535 370/354 |
| 2003/0131132 | A1* | 7/2003 | Cheng | H04L 12/6418 709/239 |
| 2005/0265322 | A1* | 12/2005 | Hester | H04M 3/5191 370/352 |
| 2007/0038513 | A1* | 2/2007 | Flax | G06Q 30/00 705/14.44 |
| 2007/0064607 | A1 | 3/2007 | Moon et al. | |
| 2007/0112964 | A1* | 5/2007 | Guedalia | H04L 29/06027 709/227 |
| 2007/0121866 | A1* | 5/2007 | Kniveton | H04M 3/42187 379/201.1 |
| 2007/0220092 | A1* | 9/2007 | Heitzeberg | H04L 12/1818 709/204 |
| 2007/0220275 | A1* | 9/2007 | Heitzeberg | H04L 63/08 713/186 |
| 2007/0238472 | A1* | 10/2007 | Wanless | H04L 29/06027 455/461 |
| 2008/0031425 | A1* | 2/2008 | Glynn | H04M 1/2535 379/32.04 |
| 2008/0080485 | A1* | 4/2008 | Rosen | H04M 1/2535 370/352 |
| 2008/0214213 | A1* | 9/2008 | Etemad | H04W 12/02 455/456.6 |
| 2012/0224528 | A1* | 9/2012 | Tapia | H04W 4/18 370/328 |
| 2013/0142065 | A1* | 6/2013 | Bartlett | H04W 40/00 370/252 |
| 2013/0322255 | A1* | 12/2013 | Dillon | H04L 47/22 370/236 |
| 2014/0108568 | A1* | 4/2014 | Lee | H04L 12/1818 709/206 |

FOREIGN PATENT DOCUMENTS

| | | |
|---|---|---|
| JP | 2007-526690 A | 9/2007 |
| KR | 1020060032274 A | 8/2006 |

OTHER PUBLICATIONS

International Preliminary Report on Patentability; dated Aug. 20, 2015 for PCT Application No. PCT/KR2014/000960.

* cited by examiner

COMMUNICATION SYSTEM USING HETEROGENEOUS NETWORKS

TECHNICAL FIELD

The present invention relates generally to a communication system and, more particularly, to a communication system using heterogeneous networks to support voice calls by combining private mobile networks, Mobile Network Operators (MNOs), and Public Switched Telephone Networks (PSTNs) even when an application for voice talk has not been installed on the mobile terminal.

BACKGROUND ART

Figure 1:
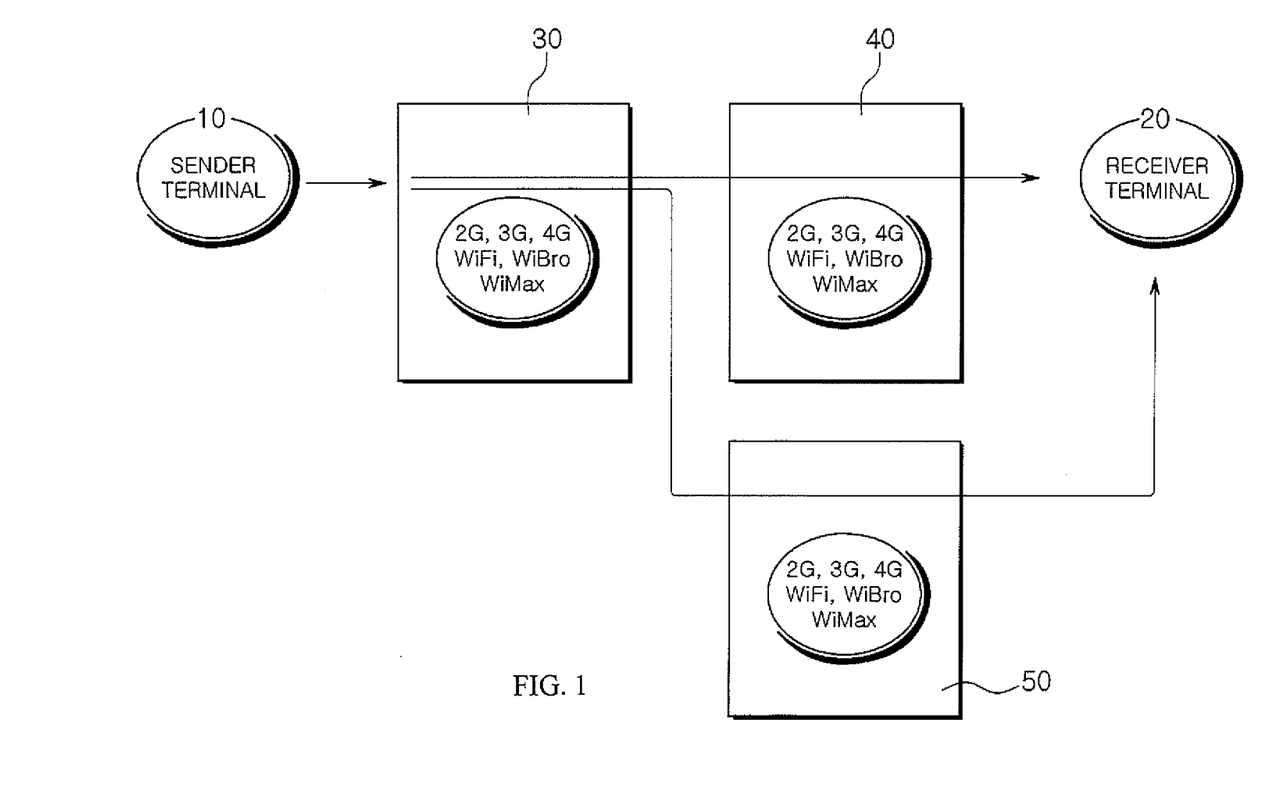
FIG. 1 shows exemplary network access in the conventional communication system.

As an instant messaging service widely used by mobile and smart phones, Kakao talk® is being widely used, and recently, it launched Voice talk, which is an application offering free voice calls. For Voice over Internet Protocol (VoIP)-based services like instant messaging services or Voice talk, a dedicated application such as the KaKao application, which is used to send and/or receive instant messages or voice packets, needs to be installed in mobile terminals of both the sender and the receiver. The dedicated application sends and/or receives instant messages or voice packets using an MNO provided by a communication company, as shown in FIG. 1, and if the sender and the receiver sign up for different communication companies, instant messages or voice packets may be sent and/or received with different MNOs belonging to different communication services cooperating with each other.

That is, conventional instant messages or voice packets can be exchanged only when the same dedicated applications are installed on both the sender mobile terminal and the receiver mobile terminal.

To solve the problem with the dedicated application, Korean Patent No. 2001-0061989 proposed an instant messaging system, in which a sender uses a phone number of a receiver as an account to offer instant messages to the receiver. However, with the invention proposed by the Korean Patent No. 2001-0061989, only text can be exchanged by means of the phone number of the receiver as an account, but mobile VoIP (mVoIP)-based free voice calls cannot be provided.

At present, Kakao, which is an instant messaging service, is now providing Voice talk thus enabling fee voice calls, but Voice talk suffers from limitations that such services are only enabled among mobile terminals on which the same dedicated application is installed.

DISCLOSURE

Technical Problem

Accordingly, the present invention has been made keeping in mind the above problems occurring in the prior art, and an object of the present invention is to provide a communication system using heterogeneous networks over which mobile Voice over Internet Protocol (mVoIP)-based free calls and high-quality voice calls are enabled even when there is no dedicated application installed on both sender and receiver terminals.

Technical Solution

In accordance with an aspect of the present invention, a communication system using heterogeneous networks is provided. The communication system is characterized by: implementing a mobile Voice over Internet Protocol (mVoIP) environment with an IP network including one of a Mobile Network Operator (MNO) and a private mobile network, and a Public Switched Telephone Network (PSTN), and making network access with a sender terminal and a receiver terminal, on which an application for supporting voice calls is installed based on the mVoIP environment, obtaining network state information about at least one of a network accessed to the sender terminal, a condition of the network, and a voice call option through the application, if the application is installed on the sender terminal and the sender terminal sends a call access request to the receiver terminal, and setting up one of a lowest cost route and a best quality route between the sender terminal and the receiver terminal as a communication route, based on the network state information, wherein the communication route is formed in selective combination of the IP network and the PSTN network.

In accordance with another aspect of the present invention, a communication system using heterogeneous networks is provided. The communication system includes a first media gateway that gets network access to a sender terminal over one of an IP network and a PSTN; a second media gateway that gets network access to a receiver terminal over one of an IP network and a PSTN; a message processing server that obtains network state information through an application installed in one of the sender terminal and the receiver terminal, the network state information including information about a network accessed by one of the sender terminal and the receiver terminal, a condition of the network, and a voice call option; and a route and call processing server that forms a communication route for one of communication cost and call quality by referring to the network state information, wherein the communication route is formed in selective combination of the IP network and the PSTN.

Advantageous Effects

According to the present invention, the communication system using heterogeneous networks forms a communication route between sender and receiver terminals by selectively combining Internet Protocol (IP) networks and Public Switched Telephone Networks (PSTNs), to perform voice calls while satisfying one of the preference conditions of free calls, quality of calls, and optimum costs.

BEST MODE

'Sender terminal' and 'receiver terminal' as herein used may be mobile devices like cell phones, smart phones, and Personal Digital Assistants (PDAs), or communication devices like common wired phones and Internet phones. Applications (Apps) may be installed on the cell phones, smart phones, and PDAs, but are limitedly installed on wired phones or Internet phones.

Even if both of the sender terminal and the receiver terminal are smart phones, a dedicated application may not be installed on the receiver terminal. Since the receiver terminal is not required to install the application, it may be any of common wired phones, smart phones, feature phones, Internet phones, and other various voice call-enabled devices. However, it is not limited thereto.

Reference numerals 30 and 40 as herein used may indicate Mobile Network Operators (MNOs) or Mobile Virtual Network Operators (MVNOs).

A 'VoIP' gateway as herein used may perform voice communication with a sender terminal or a receiver terminal according to at least one protocol of H.323, Session Initiation Protocol(SIP), Media Gateway Control Protocol (MGCP), Inter-Asterisk eXchange (IAX), Web Real-Time Communication (WebRTC), Real-Time Transport Protocol (RTP), Secure Real-Time Transport Protocol (SRTP) and RTP Control Protocol (RTCP), and a 'PSTN gateway' as herein used may perform voice communication with a sender terminal or a receiver terminal according to at least one protocol of No. 7 (SS7), ISDN BRI, ISDN PRI, E1/T1 MFC-R2, E1/T1 CAS, T1 Robbed-Bit, Analog Loop Start, Analog Ground Start, Analog Kool Start, GSM, CDMA, WCDMA, LTE, and LTE Advanced. However, it is not limited thereto.

The present invention will now be described in more detail with reference to accompanying drawings.

Figure 2:
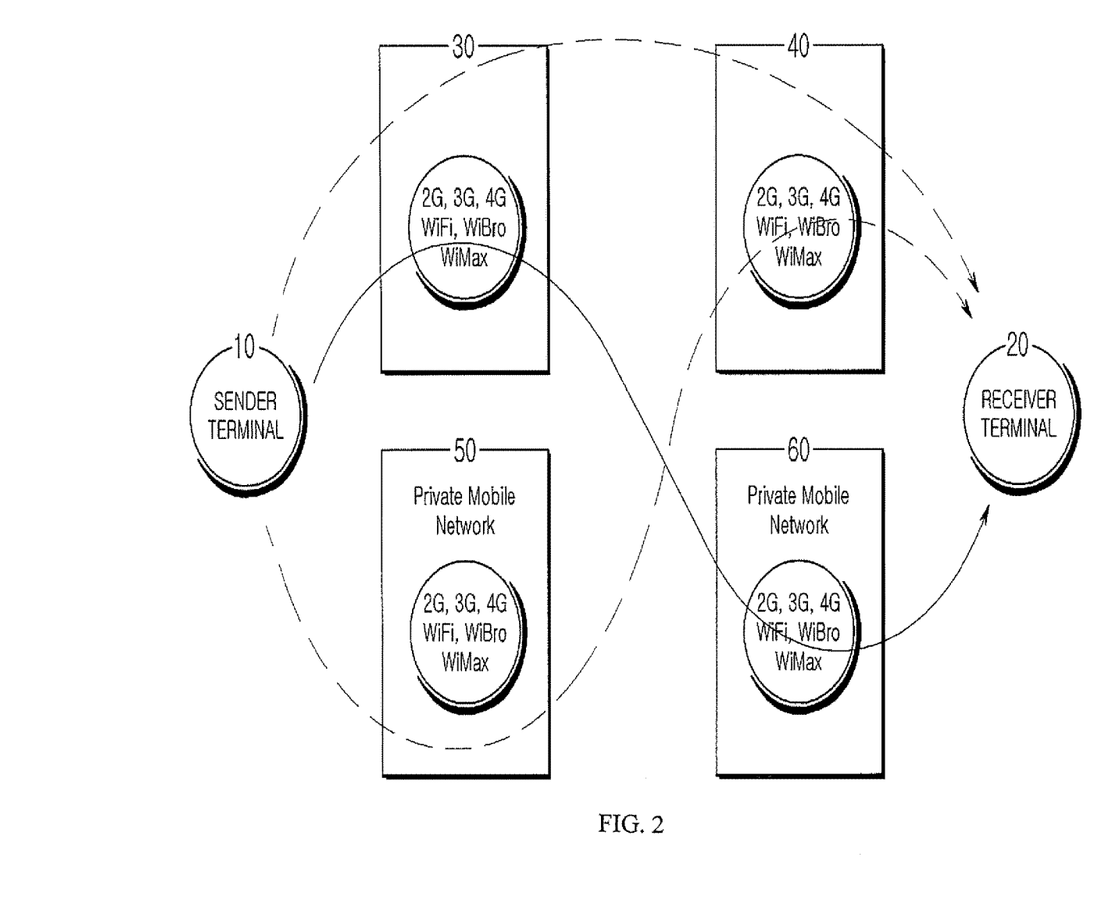
FIG. 2 conceptually shows routes along which voice packets are delivered between a sender terminal and a receiver terminal in a communication system using heterogeneous networks, according to an embodiment of the present invention.

FIG. 2 conceptually shows routes along which voice packets are delivered between a sender terminal and a receiver terminal in a communication system using heterogeneous networks, according to an embodiment of the present invention.

Referring to FIG. 2, a communication system using heterogeneous networks in accordance with the present invention (hereinafter, simply referred to as 'communication system') may form a voice packet route between a sender terminal 10 and a receiver terminal 20 by selectively combining Mobile Network Operators (MNOs) 30 and 40 and private mobile networks 50 and 60. The private mobile networks 50 and 60 may be small wireless networks operated by private wireless routers or companies in the form that supports Wi-Fi or Wibro.

MNOs 30 and 40 may refer to systems that belong to communication companies providing wireless voice call services between the sender terminal 10 and the receiver terminal 20 and provide wireless communication based on 2G, 3G, 4G, Wi-Fi, Wibro, and Wimax standards. Likewise, the private mobile networks 50 and 60 may provide wireless communication based on one of the 2G, 3G, 4G, Wi-Fi, Wibro, and Wimax standards. The communication system in accordance with the present invention may form a communication route by selectively using the private mobile networks 50 and 60 and the MNOs 30 and 40. For example, in the communication system, the sender terminal 10 may perform call access with the receiver terminal 20 through the MNOs 30 and 40, or through the MNO 30 and the private mobile network 60. Alternatively, the sender terminal 10 may perform call access with the receiver terminal 20 through the MNO 40 and the private mobile network 60. As such, the communication system may form a communication route with better call quality by selectively connecting the MNOs 30 and 40 and the private mobile networks 50 and 60, form a communication route for free calls, or form a communication route with the lowest cost.

Free calls as herein used may be enabled not only when the sender terminal 10 and the receiver terminal 20 are located in an area, such as a Wi-Fi area where free call is enabled, but also when the sender terminal 10 uses the MNOs 30 and 40. If the sender terminal 10 is a mobile terminal like a cell phone or a smart phone, it is often offered free call minutes from a communication company, in which case, a communication route via the MNOs 30 and 40 may also provide a free call service that enables free voice calls for a certain amount of time. In this case, the communication system may obtain information about free call minutes available to the sender terminal 10 through a server on the side of the communication company.

If free call minutes are given to the sender terminal 10, the communication system 100 may form a communication route that involves the MNOs 30 and 40 as a free call communication route, and in this case, the communication system 100 may check the free call minutes to meet the free call condition.

Figure 3:
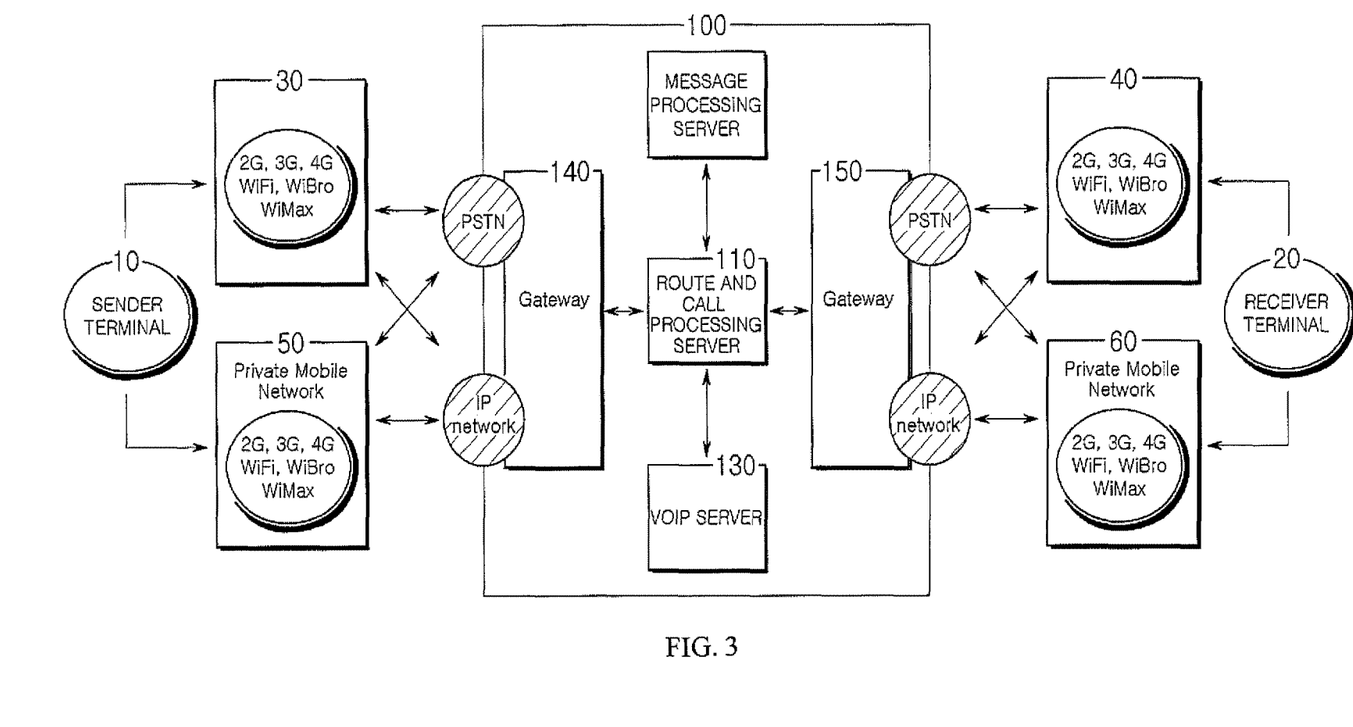
FIG. 3 is a block diagram of a communication system, according to an embodiment of the present invention.

FIG. 3 is a block diagram of the communication system.

Referring to FIG. 3, the communication system 100 may be configured to include a route and call processing server 110, a message processing server 120, a VOIP server 130, a first media gateway 140, and a second media gateway 150.

The first media gateway 140 may make network access with the sender terminal 10 through the MNO 30 or the private mobile network 50, may include a PSTN gateway or a VOIP gateway for voice or video call transmission/reception to/from the MNO 30, and may make access with the MNO 30 via a PSTN or an IP network. Likewise, the private mobile network 50 may also access the first media gateway 140 through the PSTN or the IP network.

The second gateway 150 may access the MNO 40 or the private mobile network 60 connected to the receiver terminal 20 Like the first media gateway 140, the second media gateway 150 may include a PSTN gateway and a VOIP gateway. The first and second media gateways 140 and 150 need to convert voice packets directed toward the receiver terminal 20 from the sender terminal 10 based on protocols of the MNOs 30 and 40, and the private mobile networks 50 and 60. The first and second media gateways 140 and 150 may have Session Initiation Protocol (SIP), H.323, Media Gateway Control Protocol (MGCP) or Web Real Time Communication (WebRTC) protocol as a VoIP related protocol, and additionally have NO. 7(SS7), E1/T1 ISDN, E1/T1 MFC R2, or Analog Loop Start protocol as a voice processing related protocol for public telephone networks. However, they are not limited thereto.

The message processing server 120 may determine which network the sender terminal 10 or the receiver terminal 20 is accessing, how the condition of the network is, or which voice call option the sender terminal 10 or the receiver terminal 20 sets up, and may generate state information and provide the state information to the route and call processing server 110.

When connected to the sender terminal 10 and the receiver terminal 20, the sender terminal 10, or both the sender and receiver terminals 10 and 20 having the same dedicated application installed therein, the VOIP server 130 may allow the terminal(s) to send/receive instant messages or voice packets with the dedicated application. The 'dedicated application' as herein used may refer to an application that provides free voice communication, e.g., an application distributed from the applicant's web site, http://www.playoto.com.

The route and call processing server 110 may obtain a network accessed to the sender terminal 10 or the receiver terminal 20, a condition of the network, and a voice call option of the sender terminal 10, may determine whether the sender terminal 10 prioritizes call quality or free calls by referring to the voice call option, and may form a communication route based on the determination result. The communication route may be formed by selectively combining the private mobile networks 50 and 60, and PSTNs. If there are free communication minutes given by the communication company that offers the communication service to the sender terminal 10, the communication route may be classified for free communication even if the MNOs 30 and 40 are involved in the communication route.

This means that if the communication route is set up for free communication, it is available for free calls even if MNOs 30 and 40 are involved in the communication route.

Figure 4:
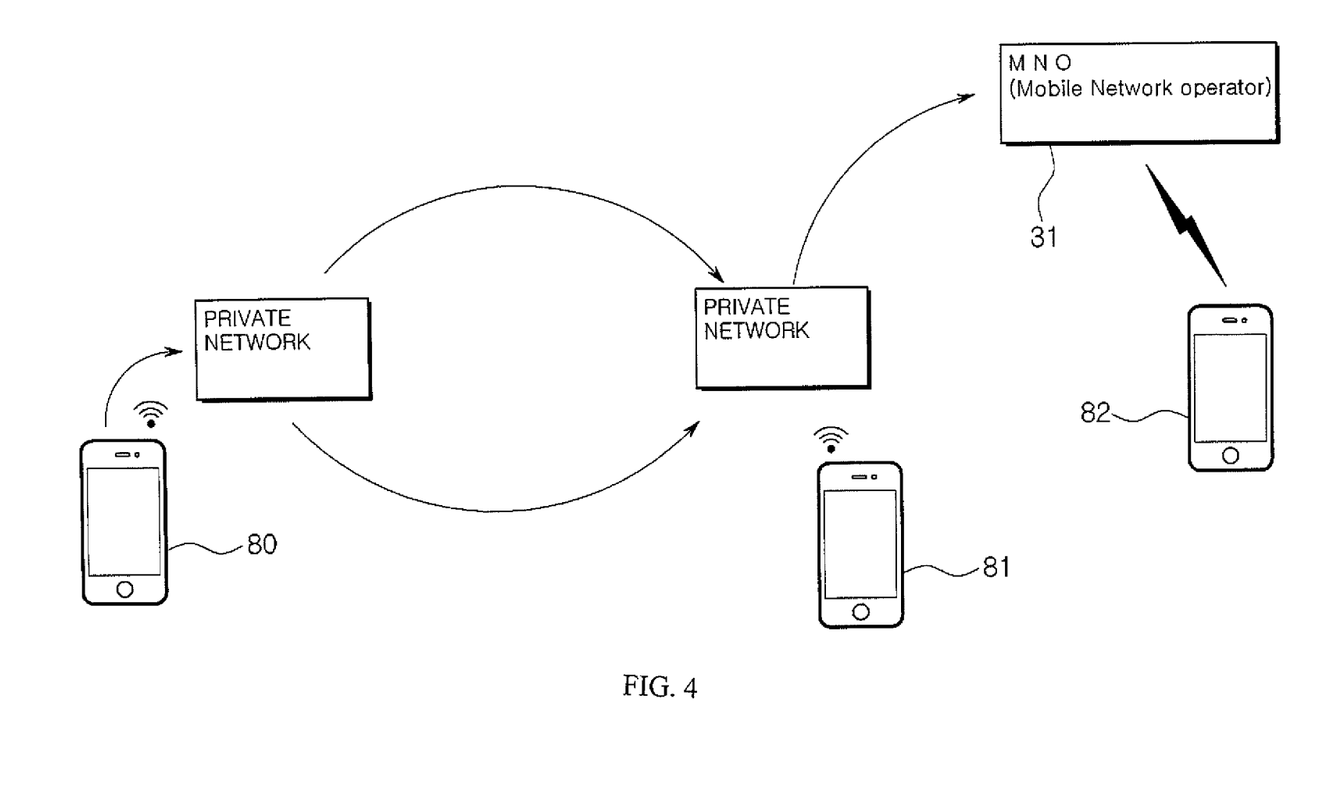
FIG. 4 shows an exemplary way of connecting private mobile networks and a Mobile Network Operator (MNO) via communication routes.

FIG. 4 shows an exemplary way of connecting private mobile networks and a Mobile Network Operator (MNO) via communication routes.

Referring to FIG. 4, mobile terminals 80 and 81 are of a type that is available for mobile network, and may wirelessly access nearby wireless routers or wireless company networks. Such wireless routers or wireless company networks may be connected to a wired network, and the wireless routers or wireless company networks may be called 'private mobile networks'.

The mobile terminals 80 and 81 may get network access to an MNO 31 over the private mobile network, and may be connected to the receiver terminal 82 through the MNO 31.

With this network access, the mobile terminals 80 and 81 may be connected to the receiver terminal 82 on the VOIP basis, and at this time, if the MNO 31 belonging to a server of a communication company is able to allocate free data usage minutes to the mobile terminals 80 and 81, a communication route available for free calls may be formed even in a combination of the MNO 31 and private mobile networks. In some cases, a communication route available for free calls may be formed using a free call event offered by the communication company. For this, the communication system may be connected to a server of the communication company and obtain free call minutes and event information for the mobile terminals 80 and 81 through the server.

Figure 5:
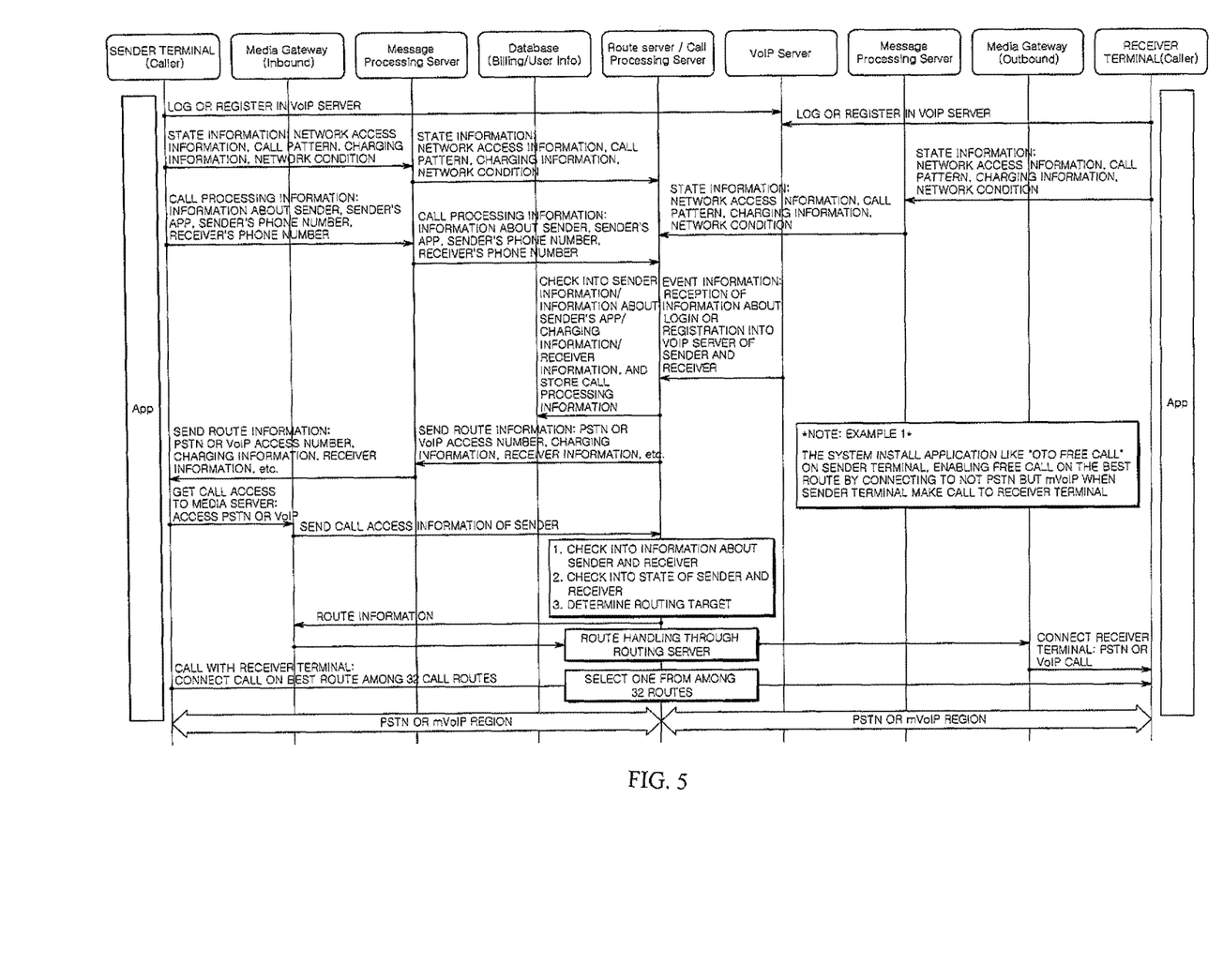
FIGS. 5 and 6 are flowcharts illustrating call processing and accessing procedures, according to an embodiment of the present invention.
Figure 6:
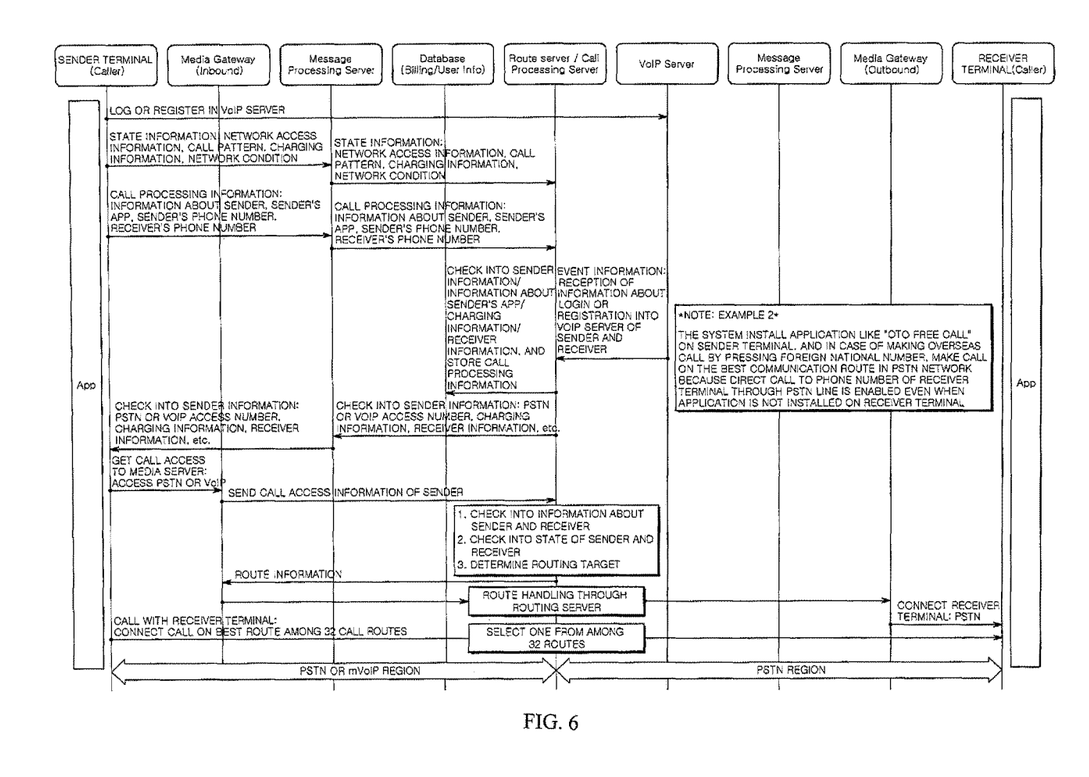

FIGS. 5 and 6 are flowcharts illustrating call processing and accessing procedures, according to the present invention.

First, FIG. 5 illustrates the flowchart for an optimum quality route that prioritizes call quality.

Referring to FIG. 5, the sender terminal 10 and the receiver terminal 20 may log in or register their users in the VOIP server 130.

The message processing server 120 may obtain state information from the sender terminal 10 and the receiver terminal 20 registered (or logged) in the VOIP server 130, and provide the state information to the route and call processing server 110. The state information as herein used refers to information about communication networks to which the sender terminal 10 and the receiver terminal 20 belong, quality of the networks, and voice call options, and may refer to information according to which whether the voice call option is set up to prioritize call quality or call charges. In case of prioritizing the call quality, the route and call processing server 110 needs to form a communication route using the MNOs 30 and 40 and the private mobile networks 50 and 60 that provide seamless call services and have better voice distinction at the expense of charging the sender terminal 10 and the receiver terminal 20 higher call cost, and in case of prioritizing the call cost, it needs to form a communication route by making the most of Wi-Fi, Wibro, and other networks that provide free calls. According to the voice call option set up by the sender terminal 10, information about a communication cost to be paid by the sender terminal 10 may be provided to the route and call processing server 110.

When the state information is provided to the route and call processing server 110, the VOIP server 130 may notify the route and call processing server 110 of login states of the sender and receiver terminals 10 and 30, and the route and call processing server 110 may store information about the sender, information about the sender's application, charging information, information about the receiver, and call processing information, and provide the message processing server 120 with route information that includes information about PSTN, VOIP access number, charging, and receiver. The message processing server 120 may provide the route information to the sender terminal 10; the sender terminal 10 may get PSTN or VOIP access to the first media gateway 140; and the first media gateway 140 may send the route and call processing server 110 information about call access of the sender terminal 10. After that, the route and call processing server 110 may check into the information about the sender and receiver, and the network conditions of the sender and receiver terminals 10 and 20, and then form a communication route by combining networks with best conditions. The route and call processing server 110 may then provide information about the communication route (route information) to the first media gateway 140 and the second media gateway 150, which enables the sender terminal 10 and the receiver terminal 20 to perform call access between them.

FIG. 6 is the flowchart for an occasion where an application dedicated for call processing is installed only on the sender terminal.

Referring to FIG. 6, in the occasion where an application dedicated for call processing is installed on the sender terminal 10 but not on the receiver terminal 20, the sender terminal 10 only logs in (or sign up for) the VOIP server 130. After that, the sender terminal 10 may provide the state information to the message processing server 120, which may in turn forward the state information to the route and call processing server 110.

The sender terminal 10 delivers call processing information including the information about the sender, the sender's application, the sender's phone number, and the receiver's phone number to the route and call processing server 110 via the message processing server 120.

The route and call processing server 110 may store the call processing information including the information about the sender, the sender's application, the sender's phone number, and the receiver's phone number, and then provide the route information to the sender terminal 10 via the message processing server 120. The sender terminal 10 may access the first media gate server 140 by referring to the route information, and the first media gate server 140 may send the route and call processing server 110 information about call access of the sender terminal 10. The route and call processing server 110 may check into the information about the sender and receiver, and the network conditions of the sender and receiver terminals 10 and 20, and then determine a target for call access, i.e., a target for routing. Subsequent processes are the same as what are described in connection with FIG. 5.

The invention claimed is:

1. A communication system using heterogeneous networks, the system comprising:
   means for implementing a mobile Voice over Internet Protocol (mVoIP) environment with an IP network including one of a Mobile Network Operator (MNO) and a private mobile network, and a Public Switched Telephone Network (PSTN), and making IP network access with a sender terminal and PSTN network access with a receiver terminal, wherein:
      an application for supporting voice calls is installed based on the mVoIP environment on the sender terminal, but not on the reciever terminal, and
      the IP network supports a plurality of different routes having different quality and cost,
   means for obtaining network state information about the IP network accessing the sender terminal, a condition of the IP network, a telephone number for the sender terminal, a telephone number for the reciever terminal, and a voice call option for the sender terminal through the application installed on the sender terminal when the sender terminal sends a call access request to the receiver terminal, wherein the voice call option for the sender terminal indicates wheather the sender terminal is set up to prioritize call quality or call cost, and
   means for setting up one of a lowest cost route and a best quality route between the sender terminal and the receiver terminal as a communication route, based on the network state information,
   wherein the communication route is formed in selective combination of the IP network for the sender terminal and the PSTN network for the reciever terminal.

2. The communication system of claim 1, wherein the voice call option comprises one of lowest call cost, free calls, and best call quality options.

3. The communication system of claim 1, comprising:
   a first media gateway for performing communication with the sender terminal through the IP network;
   a second media gateway for performing communication with the receiver terminal through the PSTN;
   a VoIP server for handling one of user registration and login access to the sender terminal, if the terminal requests call access to the receiver terminal;
   a message processing server for obtaining the network state information from the sender terminal; and
   a route and call processing server for forming the communication route between the sender terminal and the receiver terminal by using the network state information obtained from the message processing server.

4. The communication system of claim 3, wherein the first media gateway comprises
   a VOIP gateway accessed by the sender terminal over the IP network.

5. The communication system of claim 3, wherein the second media gateway comprises a PSTN gateway accessed by the receiver terminal over the PSTN.

6. The communication system of claim 4, wherein the VOIP gateway performs voice communication with the sender terminal according to at least one protocol of H.323, Session Initiation Protocol(SIP), Media Gateway Control Protocol (MGCP), Inter-Asterisk eXchange (IAX), Web Real-Time Communication (WebRTC), Real-Time Transport Protocol (RTP), Secure Real-Time Transport Protocol (SRTP) and RTP Control Protocol (RTCP).

7. The communication system of claim 1, wherein the receiver terminal comprises one of a feature phone, a smart phone, a wired phone, and an Internet phone.

8. A communication system using heterogeneous networks comprising:
   a first media gateway that gets network access to a sender terminal over an IP network, wherein the IP network supports a plurality of different routes having different quality and cost;
   a second media gateway that gets network access to a receiver terminal over a PSTN;
   a message processing server that obtains network state information through an application installed in the sender terminal, the network state information including information about the IP network accessed by the sender terminal, a condition of the IP network, a telephone number for the sender terminal, a telephone number for the receiver terminal, and a voice call option for the sender terminal, wherein:
      the voice call option for sender terminal indicates whether the sender terminal is set up to prioritize call quality or call cost; and
      the application is not installed in the reciever terminal; and
   a route and call processing server that forms a communication route for one of communication cost and call quality by referring to the network state information,
   wherein the communication route is formed in selective combination of the IP network for the sender terminal and the PSTN for the receiver terminal.

9. The communication system of claim 8, wherein the network state information includes at least a piece of information about a communication network to which the sender terminal belongs, quality of the communication network, and the voice call option.

10. The communication system of claim 9, wherein the voice call option comprises one of the lowest call cost, free calls, and best call quality options.

11. The communication system of claim 5,
   wherein the PSTN gateway performs voice communication with the receiver terminal according to at least one protocol of No.7 (SS7), ISDN BRI, ISDN PRI, E1/T1 MFC-R2, E1/T1 CAS, T1 Robbed-Bit, Analog Loop Start, Analog Ground Start, Analog Kool Start, GSM, CDMA, WCDMA, LTE, and LTE Advanced.

* * * * *